United States Patent Office
3,575,991
Patented Apr. 20, 1971

3,575,991
1-[4-ARYL - 5 - CARBOXYMETHYL-2-THIAZOLYL]-1,6-DIHYDRO - 6 - OXONICOTINIC ACIDS AND ESTERS THEREOF
Dong H. Kim, Wayne, Stanley C. Bell, Penn Valley, and Arthur A. Santilli, Havertown, Pa., assignors to American Home Products Corporation, New York, N.Y.
No Drawing. Filed Mar. 11, 1969, Ser. No. 806,294
Int. Cl. C07d 31/50
U.S. Cl. 260—294.8
6 Claims

ABSTRACT OF THE DISCLOSURE

This invention concerns 1-[4-aryl-5-carboxymethyl-2-thiazolyl]-1,6-dihydro-6-oxonicotinic acids and esters thereof which are pharmacologically active as central nervous system depressants. Further, it relates to the process of their preparation by the reaction of a 2-amino-4-aryl-5-thiazoleacetic acid ester with an alkyl coumalate.

The present invention relates to new and novel thiazolyl oxonicotinic acids and the esters thereof. In particular, it concerns 1-[4-aryl-5-carboxymethyl-2-thiazolyl]-1,6-dihydro-6-oxonicotinic acids and esters thereof which in standard and accepted biological tests have demonstrated usefulness as central nervous system depressants. Further, this invention also relates to the process of preparing these compounds by the reaction of a 2-amino-4-aryl-5-thiazoleacetic acid ester with an alkyl coumalate.

The new and novel compounds within the scope of the present invention are exemplified by the following formula:

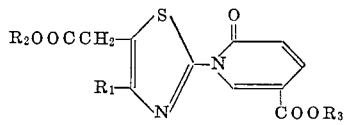

wherein $R_1$ is selected from the group consisting of hydrogen, phenyl, halophenyl, lower alkylphenyl, lower alkoxyphenyl, thienyl, pyridyl and furyl; and $R_2$ and $R_3$ are selected from the group consisting of hydrogen and lower alkyl with the proviso that when $R_2$ is hydrogen $R_3$ is hydrogen. As employed herein the terms "lower alkyl," "lower alkoxy" and the like are meant to include both branched and straight chain moieties containing from one to about six carbon atoms. Typical examples are: 1-[5-carboxymethyl - 4 - (p-chlorophenyl)-2-thiazolyl]-1,6-dihydro-6-oxonicotinic acid, 1-ethyl, 3-methyl ester; 1-[5-carboxymethyl-4-phenyl-2-thiazolyl]-1,6-dihydro - 6 - oxonicotinic acid, 3-ethyl, 1-methyl ester; 1-[5-carboxymethyl-4-(p-tolyl)-2-thiazolyl]-1,6-dihydro-6-oxonicotinic acid, 1,3-diethyl ester; 1-[5-carboxymethyl-4-(p-methoxyphenyl)-2-thiazolyl]-,6-dihydro-6-oxonicotinic acid, 1,3-diethyl ester; 1-[5-carboxymethyl-4-pyridyl-2-thiazolyl]-1,6-dihydro-6-oxonicotinic acid, 1-ethyl, 3-methyl ester; 1-[5-carboxymethyl - 4-furyl-2-thiazolyl]-1,6-dihydro-6-oxonicotinic acid, 3-ethyl, 1-methyl ester; and 1-[4-(p-bromophenyl) - 5-carboxymethyl-2-thiazolyl]-1,6-dihydro-6-oxonicotinic acid, 1-ethyl, 3-methyl ester.

The new and novel process of this invention which is utilized to prepare the 1-[4-aryl-5-carboxymethyl-2-thiazolyl]-1,6-dihydro-6-oxonicotinic acid esters of this invention is hereinafter depicted by the following reaction scheme:

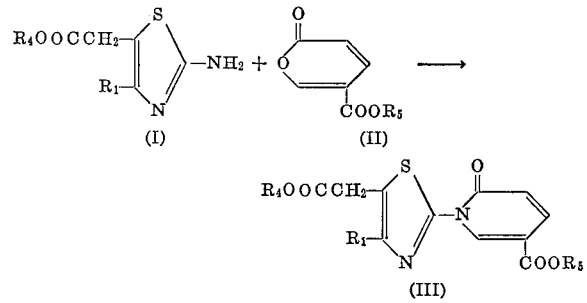

wherein $R_1$ is defined as above and $R_4$ and $R_5$ are lower alkyl. The reaction is effected by contacting an appropriate 2-amino-4-aryl-5-thiazoleacetic acid ester (I) with an alkyl coumalate (II) in an anhydrous alkanol at about the reflux temperature of the reaction mixture for a period of about one to about three hours.

When the reaction is complete, the resulting 1-[4-aryl-5 - carboxymethyl-2-thiazolyl]-1,6-dihydro-6-oxonicotinic acid ester (III) is separated by conventional recovery procedures. For example, the precipitated product is separated by filtration, washed, dried and recrystallized from a suitable solvent e.g. dimethylformamide and dimethylacetamide to afford the pure product (III).

The 1-[4-aryl-5-carboxymethyl-2-thiazolyl]-1,6-dihydro-6-oxonicotinic acids of this invention are prepared by converting the above-prepared 1-[4-aryl-5-carboxymethyl-2-thiazolyl]-1,6-dihydro-6-oxonicotinic acid esters (III) to their corresponding carboxylic acids by standard organic procedures, such as, dissolving an appropriate ester (III) in an alkanol in the presence of an alkali metal hydroxide, heating the mixture to about 50° C. for a period of about one hour, acidifying the reaction mixture with a mineral acid and then separating the resulting carboxylic acid by routine techniques. Preferably this reaction is conducted using sodium hydroxide as the alkali metal hydroxide and hydrochloric acid as the mineral acid.

The 2-amino-4-aryl-5-thiazoleacetic acid esters (I) employed as starting materials in the process of the present invention may be prepared by the process which is schematically illustrated as follows:

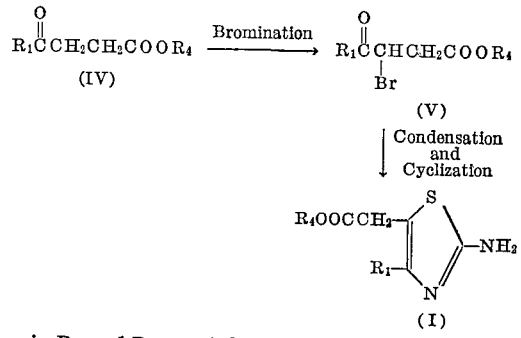

wherein $R_1$ and $R_4$ are defined as above. The bromination reaction is effected by the drop-wise addition of bromine to a boiling solution of a 3-arylpropionic acid ester (IV) in a reaction-inert organic solvent e.g. chloroform, carbon tetrachloride and methylene chloride. The reaction mixture is then heated to about reflux temperatures for a period of about one hour. When the bromination is complete, the resulting 3-aryl-3-bromopropionic acid, alkyl ester (V) is recovered by routine procedures e.g. the reaction mixture is washed with water; the organic layer is then separated, dried, evaporated and the resulting residue recrystallized from an appropriate solvent, such as, an alkanol.

The condensation and cyclization reaction is effected by contacting a 3-aryl-3-bromopropionic acid, alkyl ester (V) with thiourea in an alkanol, in the presence of an alkali metal carbonate, at about reflux temperatures for a period of about two hours. When the condensation and cyclization reaction is complete, the resulting product (I) is separated by standard methods. For example, the hot reaction mixture is filtered, the residue washed and recrystallized to afford an appropriate 2-amino-4-aryl-5-thiazoleacetic acid, alkyl ester (I).

Alternatively, these 2 - amino - 4-aryl-5-thiazoleacetic acid esters (I) starting materials may be prepared by the reaction sequence hereinafter depicted:

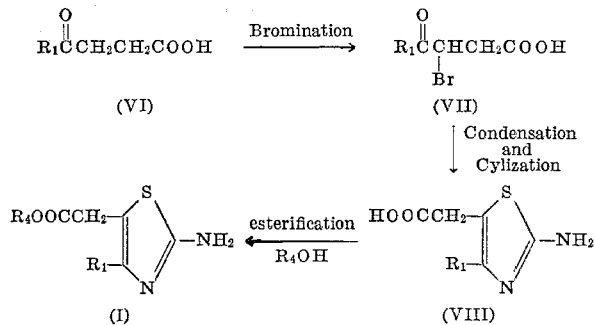

wherein $R_1$ and $R_4$ are defined as above. The bromination is effected by contacting a 3-arylpropionic acid (VI) with bromine in the manner described in the former reaction sequence. When the bromination is complete, the resulting 3 - aryl - 3 - bromopropionic acid (VII) is condensed and cyclized as set forth in the former reaction to afford a 2-amino - 4 - aryl - 5-thiazoleacetic acid (VIII). This latter amine (VIII) is then esterified by conventional procedures to yield the corresponding 2-amino-4-aryl-5-thiazoleacetic acid ester (I). The alkyl coumalates (II) employed in the above reaction are commercially available and can also be readily prepared by well known chemical procedures.

The new and novel 1-[4-aryl-5-carboxymethyl-2-thiazolyl] - 1,6 - dihydro - 6 - oxonicotinic acids and the esters thereof of this invention possess valuable pharmacological activity. In particular, these compounds in standard pharmacological procedures demonstrate nervous system activity and are useful as depressants. Because of this property they are of particular importance in producing a calming effect in animals In the pharmacological evaluation of the central nervous system depressant compounds of this invention the in vivo effects of the compounds of this invention are tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e. flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention in the above test procedure induce decreased motor activity when administered intraperitoneally at a dosage range of 127 to 400 mg./kg. There were no deaths in the test animals at the highest dose used, 400 mg./kg. intraperitoneally.

When the compounds of this invention are employed as central nervous system depressants they may be administered to warm-blood animals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I

Bromine (127 g.) is added dropwise to a boiling solution of 190 g. of 3-(p-chlorobenzoyl)propionic acid, ethyl ester in 1.2 liters of chloroform, and then the reaction mixture is refluxed for one hour. After being cooled to room temperature, the reaction mixture is washed with water several times. The chloroform layer is dried over anhydrous magnesium sulfate and evaporated to dryness under reduced pressure. The solid obtained is recrystallized from ethanol giving 199 g. of product. A second recrystallization gives 3-bromo-3-(p-chlorobenzoyl)propionic acid, ethyl ester, M.P. 74–77° C.

Analysis.—Calcd for $C_{12}H_{12}BrClO_3$ (percent): C, 45.10; H, 3.78; Br, 25.00; Cl, 11.09. Found (percent): C, 45.08; H, 3.53; Br, 24.78; Cl, 10.99.

A mixture of 3.2 g. of the above-prepared 3-bromo-3-(p-chlorobenzoyl)propionic acid, ethyl ester, 1.6 g. of thiourea, 2.2 g. of sodium carbonate and 30 ml. of isopropanol is stirred at room temperature for one-half hour and then heated to reflux for two hours. The reaction solution is filtered while hot; the residue is washed with a small amount of isopropanol. After cooling the filtrate in ice, a crystalline product separates. Two recrystallizations of the material from ethanol gives 2.0 g. of 2-amino-4-(p-chlorophenyl) - 5 - thiazoleacetic acid, ethyl ester, M.P. 149–152° C.

Analysis.—Calcd for $C_{13}H_{13}ClN_2O_2S$ (percent): C, 52.62; H, 4.42; N, 9.44; Cl, 11.95; S, 10.78. Found (percent): C, 52.73; H, 4.58; N, 9.41; Cl, 12.19; S, 10.60.

To a stirring solution of the above-prepared 2-amino-4-(p-chlorophenyl) - 5 - thiazoleacetic acid, ethyl ester (2.9 g.) in absolute ethanol (100 ml.), there is added 1.5 g. of methyl coumalate dissolved in 10 ml. of absolute ethanol, and the resulting mixture is stirred at room temperature for three hours, then refluxed for three hours, and allowed to set overnight. The separated crystals are collected on a filter and washed with ethanol to give 0.5 g. of product, M.P. 191–195° C. Recrystallization from dimethylformamide affords 1 - [5 - carboxymethyl- 4 - (p - chlorophenyl) - 2 - thiazolyl] - 1,6 - dihydro-6-oxonicotinic acid, 1-ethyl, 3-methyl ester, M.P. 195–198° C.

*Analysis.*—Calcd for $C_{20}H_{17}ClN_2O_5S$ (percent): C, 55.49; H, 3.96; N, 6.47; S, 8.19. Found (percent): C, 55.36; H, 3.85; N, 6.74; S, 8.40.

EXAMPLE II

Bromine (64 g.) is added dropwise to a boiling solution of 95 g. of 3-benzoylpropionic acid, methyl ester in 0.6 liter of carbon tetrachloride, and then the reaction mixture is refluxed for one hour. After being cooled to room temperature, the reaction mixture is washed with water several times. The organic layer is dried over anhydrous magnesium sulfate and evaporated to dryness under reduced pressure. The solid obtained is recrystallized from ethanol giving 3-bromo-3-benzoylpropionic acid, methyl ester.

A mixture of 1.5 g. of the above-prepared 3-bromo-2-benzoylpropionic acid, methyl ester, 1.0 g. of thiourea, 1.0 g. of sodium carbonate and 15 ml. of isopropanol is stirred at room temperature for one-half hour and then heated to reflux for two hours. The reaction solution is filtered while hot; the residue is washed with a small amount of isopropanol. After cooling the filtrate in ice, a crystalline product separates. Two recrystallizations of the material from ethanol gives 2-amino-4-phenyl-5-thiazoleacetic acid, methyl ester.

To a stirring solution of the above-prepared 2-amino-4-phenyl-5-thiazoleacetic acid, methyl ester (1.5 g.) in absolute ethanol (50 ml.), there is added 0.8 g. of ethyl coumalate dissolved in 5.0 ml. of absolute ethanol, and the resulting mixture is stirred at room temperature for three hours, then refluxed for three hours, and allowed to set overnight. These separated crystals are collected on a filter and washed with ethanol to give the product. Recrystallization from dimethylformamide affords 1-[5-carboxymethyl - 4 - phenyl - 2 - thiazolyl] - 1,6 - dihydro-6-oxonicotinic acid, 3-ethyl, 1-methyl ester.

EXAMPLE III

Repeating the procedure of Examples I–II, an appropriate 3-arylpropionic acid, alkyl ester is brominated to afford a 3-aryl-3-bromo propionic acid, alkyl ester which is condensed and cyclized with thiourea to yield a 2-amino-4-aryl-5-thiazoleacetic acid, alkyl ester which is reacted with an alkyl coumalate to prepare compounds of the formula:

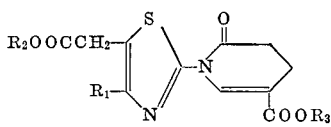

wherein $R_1$, $R_2$ and $R_3$ are defined as follows:

| R₁ | R₂ | R₃ |
| --- | --- | --- |
| p-bromophenyl | Methyl | Methyl |
| o-iodophenyl | ethyl | ethyl |
| p-tolyl | propyl | methyl |
| p-methoxyphenyl | methyl | butyl |
| 2-thienyl | ethyl | methyl |
| p-ethoxyphenyl | methyl | ethyl |
| 2-pyridyl | ethyl | propyl |
| p-butylphenyl | butyl | ethyl |
| p-fluorophenyl | methyl | ethyl |
| 2-furyl | ethyl | methyl |

EXAMPLE IV

Bromine (130 g.) is added dropwise to a boiling solution of 200 g. of 3-(p-chlorobenzoyl)propionic acid in 1.5 liters of chloroform, and then the reaction mixture is refluxed for one hour. After being cooled to room temperature, the reaction mixture is washed with water several times. The chloroform layer is dried over anhydrous magnesium sulfate, evaporated to dryness under reduced pressure. The solid obtained is recrystallized from ethanol giving 3 - bromo-3-(p-chlorobenzoyl)propionic acid.

To a solution containing 2.4 g. of thiourea, 3.3 g. of anhydrous sodium carbonate in 150 ml. of isopropanol, there is added 8.4 g. of the above-prepared 3-bromo-3-(p-chlorobenzoyl)propionic acid. The resulting mixture is stirred at room temperature for one-half hour, and then refluxed for two hours. After the removal of inorganic salt by filtration, the filtrate is evaporated in a rotary evaporator under reduced pressure to give a solid residue. The residue is dissolved in hot water and filtered. Acidification of the filtrate with 1 N hydrochloric acid to pH 2 causes separation of a precipitate which is collected on a filter and washed with water several times to give 5.1 g. of 2-amino-4-(p-chlorophenyl) - 5 - thiazoleacetic acid, M.P. 257–259° C.

*Analysis.*—Calc'd for $C_{11}H_9ClN_2O_2S$ (percent): C, 49.16; H, 3.38; N, 10.43; Cl, 13.20. Found (percent): C, 49.14; H, 3.55; N, 10.50; Cl, 13.06.

The above-prepared 2-amino-4-(p-chlorophenyl)-5-thiazoleacetic acid is dissolved in hot ethanol, in the presence of dilute hydrochloric acid, and refluxed for two hours. Thereafter, the reaction mixture is evaporated to dryness to afford 2-amino-4-(p-chlorophenyl)-5-thiazoleacetic acid, ethyl ester, M.P. 149–152° C.

To a stirring solution of 2-amino-4-(p-chlorophenyl)-5-thiazoleacetic acid, ethyl ester (3.0 g.) in absolute ethanol (100 ml.), there is added 1.5 g. of ethyl coumalate dissolved in 10 ml. of absolute ethanol, and the resulting mixture is stirred at room temperature for two hours, then refluxed for two hours, and allowed to set overnight. The separated crystals are collected on a filter and washed with ethanol to give the product which is recrystallized from dimethylformamide to yield 1-[5-carboxy-4-(p-chlorophenyl)-2-thiazolyl]-1,6-dihydro - 6 - oxonicotinic acid, 1,3-diethyl ester.

EXAMPLE V

When the produce of Example III is repeated, an appropriate 3-arylpropionic acid is brominated to yield a 3-aryl-3-bromopropionic acid which is condensed and cyclized with thiourea to afford a 2-amino-4-aryl-5-thiazoleacetic acid which is esterified to the corresponding ester and then reacted with an alkyl coumalate to prepare the following compounds:

1-[5-carboxymethyl-4-phenyl-2-thiazolyl] - 1,6-dihydro-6-oxonicotinic acid, 1,3-dimethyl ester;

1-[4-(p-bromophenyl)-5-carboxymethyl-2-thiazolyl] - 1,6-dihydro-6-oxonicotinic acid, 1-ethyl, 3-methyl ester;

1-[5-carboxymethyl-4-(p-tolyl) - 2 - thiazolyl] - 1,6 - dihydro-6-oxonicotinic acid, 1,3-diethyl ester;

1-[5-carboxymethyl-4-(2-thienyl)-2-thiazolyl] - 1,6 - dihydro-6-oxonicotinic acid, 1-butyl, 3-methyl ester;

1-[5-carboxymethyl-4-(p-iodophenyl)-2-thiazolyl] - 1,6-dihydro-6-oxonicotinic acid, 3-ethyl, 1-propyl ester;

1-[5-carboxymethyl-4-(p-methoxyphenyl)-2 - thiazolyl] - 1,6-dihydro-6-oxonicotinic acid, 1,3-diethyl ester;

1-[5-carboxymethyl - 4 - (p - propoxyphenyl)-2-thiazolyl]-1,6-dihydro-6-oxonicotinic acid, 1,3-dimethyl ester;

1-[5-carboxymethyl-4-(2-pyridyl)-2-thiazolyl] - 1,6 - dihydro-6-oxonicotinic acid, 1-ethyl, 3-methyl ester;

1-[5-carboxymethyl-4-(2-furyl)-2 - thiazolyl] - 1,6 - dihydro-6-oxonicotinic acid, 3-ethyl, 1-methyl ester;

1-[4-(p-butylphenyl)-5-carboxymethyl-2-thiazolyl] - 1,6-dihydro-6-oxonicotinic acid, 1-butyl, 3-ethyl ester; and 1-[5-carboxymethyl-4-(p-fluorophenyl)-2-thiazolyl] - 1, 6-dihydro-6-oxonicotinic acid, 1,3-dimethyl ester.

EXAMPLE VI

1-[5-carboxymethyl-4-(p-chlorophenyl)-2-thiazolyl] - 1, 6-dihydro-6-oxonicotinic acid, 1-ethyl, 3-methyl ester, as prepared in Example I, is dissolved in ethanol, admixed with dilute sodium hydroxide and then warmed to 50° C. for one hour. The reaction mixture is then diluted with excess water, and acidified with 1 N hydrochloric acid.

The resulting precipitate is separated by filtration and dried to afford 1-[5-carboxymethyl-4-chlorophenyl)-2-thiazolyl]-1,6-dihydro-6-oxonicotinic acid.

In like manner, the following dicarboxylic acids are prepared:

1-[5-carboxymethyl-4-(p-totyl)-2-thiazolyl]-1,6-dihydro-6-oxonicotinic acid;

1-[5-carboxymethyl-4-(p-methoxyphenyl)-2-thiazolyl]-1,6-dihydro-6-oxonicotinic acid; and 1-[5-carboxymethyl-4-furyl-2-thiazolyl]-1,6-dihydro-6-oxonicotinic acid.

What is claimed is:

1. A compound selected from the group consisting of those having the formula:

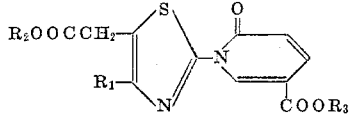

wherein $R_1$ is selected from the group consisting of hydrogen, phenyl, halophenyl, lower alkylphenyl, lower alkoxyphenyl; and $R_2$ and $R_3$ are selected from the group consisting of hydrogen and lower alkyl with the proviso that when $R_2$ is hydrogen $R_3$ is hydrogen.

2. A compound as described in claim 1 which is: 1-[5-carboxymethyl-4-(p-chlorophenyl)-2-thiazolyl]-1,6-dihydro-6-oxonicotinic acid; 1-ethyl, 3-methyl ester.

3. A compound as described in claim 1 which is: 1-[5-carboxymethyl-4-phenyl-2-thiazolyl]-1,6-dihydro-6-oxonicotinic acid, 3-ethyl, 1-methyl ester.

4. A compound as described in claim 1 which is: 1-[5-carboxymethyl-4-(p-tolyl)-2-thiazolyl]-1,6-dihydro-6-oxonicotinic acid, 1,3-diethyl ester.

5. A compound as described in claim 1 which is: 1-[5-carboxymethyl-4-(p-methoxyphenyl)-2-thiazolyl]-1,6-dihydro-6-oxonicotinic acid, 1,3-diethyl ester.

6. A compound as described in claim 1 which is: 1-[4-(p-bromophenyl)-5-carboxymethyl-2-thiazolyl]-1,6-dihydro-6-oxonicotinic acid, 1-ethyl, 3-methyl ester.

References Cited

Silberg et al.: Chem. Abstracts, vol. 61, pp. 16,060–61, December 1964.

ALAN L. ROTMAN, Primary Examiner

U.S. Cl. X.R.

260—302, 999

PO-1050
(5/69)

UNITED STATES PATENT OFFICE
CERTIFICATE OF CORRECTION

Patent No. __3,575,991__     Dated __April 20, 1971__

Inventor(s) Dong H. Kim, Stanley C. Bell and Arthur A. Santilli

It is certified that error appears in the above-identified patent and that said Letters Patent are hereby corrected as shown below:

Column 2, line 62, "aryl" should read -- aroyl --.
Column 3, line 1, "aryl" should read -- aroyl --.
Column 3, line 4, "exaporated" should read -- evaporated -
Column 3, lines 7, 35 and 38, "aryl" (each occurrence) should read -- aroyl --.
Column 5, lines 42 and 43, "aryl" (each occurrence) should read -- aroyl --.
Column 5, lines 50-55, in the formula, an additional doubl bond should appear in the right hand ring moiety so that the entire formula should read as follows:

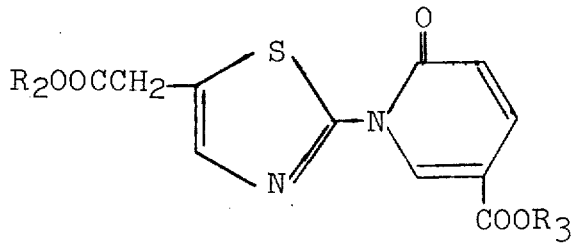

Column 6, line 39, "produce" should read -- procedure --.

Signed and sealed this 6th day of June 1972.

(SEAL)
Attest:

EDWARD M. FLETCHER, JR.
Attesting Officer

ROBERT GOTTSCHALK
Commissioner of Patents